(12) United States Patent
Prevost et al.

(10) Patent No.: US 7,300,680 B2
(45) Date of Patent: Nov. 27, 2007

(54) SOY PROTEIN PRODUCTS AND METHODS FOR PRODUCING SOY PROTEIN PRODUCTS

(76) Inventors: John E. Prevost, P.O. Box 520, Slaughter, LA (US) 70777; Neal A. Hammond, 3168 Fleet Ct., Cameron Park, CA (US) 95682

( * ) Notice: Subject to any disclaimer, the term of this patent is extended or adjusted under 35 U.S.C. 154(b) by 279 days.

(21) Appl. No.: 10/458,480

(22) Filed: Jun. 10, 2003

(65) Prior Publication Data

US 2004/0028774 A1 Feb. 12, 2004

Related U.S. Application Data

(63) Continuation of application No. 10/008,834, filed on Nov. 9, 2001, now abandoned, which is a continuation of application No. 09/229,286, filed on Jan. 13, 1999, now abandoned.

(51) Int. Cl.
*A23J 3/16* (2006.01)

(52) U.S. Cl. .................... 426/46; 426/634; 426/52
(58) Field of Classification Search .............. 426/52, 426/634, 46
See application file for complete search history.

(56) References Cited

U.S. PATENT DOCUMENTS

| 4,431,629 | A | * | 2/1984 | Olsen | 426/46 |
| 4,483,874 | A | * | 11/1984 | Olsen | 426/44 |
| 5,100,679 | A | * | 3/1992 | Delrue | 426/44 |
| 5,508,172 | A | * | 4/1996 | Wong et al. | 435/18 |
| 5,716,801 | A | * | 2/1998 | Nielsen et al. | 435/68.1 |

* cited by examiner

*Primary Examiner*—Keith Hendricks
(74) *Attorney, Agent, or Firm*—Roy, Kiesel, et al

(57) ABSTRACT

A method for producing an enzymatically stabilized soy meal containing a naturally-occurring trypsin inhibitor to produce a soluble, pleasant-tasting soy product which comprises enzymatically deactivating the trypsin inhibitors in the soy meal without using heat, and treating the soy meal makes the carbohydrates and proteins more digestible.

126 Claims, 2 Drawing Sheets

SOY PROTEIN PRODUCTS AND METHODS FOR PRODUCING SOY PROTEIN PRODUCTS

This application is a continuation of application No. 10/008,834, filed Nov. 9, 2001, now abandoned, which is a continuation of application Ser. No. 09/229,286, filed Jan. 13, 1999, now abandoned.

BACKGROUND OF THE INVENTION

1. Field of the Invention

This invention relates to new and useful soy products and methods for producing the products.

2. Prior Art

The increasing evidence that a proper diet is linked to good health and the prevention of diseases has led consumers to demand products that help develop healthy diets with more nutrients and less fat, cholesterol, and calories. Food processors interested in satisfying consumer demand are looking at healthy ingredients to develop such food products. One source for healthy ingredients is the soybean. The increasing evidence that soybeans may help prevent and treat certain diseases, such as heart disease and cancer, has renewed consumer and processor interest in soybeans as a source for foods and ingredients. Food processors are familiar with many uses of soybeans because of their multifunctional value, natural ingredients, and reasonable prices.

Many processors prefer to use soybeans because of their high protein content and their ability to mimic animal products such as meat, eggs, or milk. Processors also prefer soybeans because of their broad consumer appeal. Food processors have been careful and reluctant to use soybeans as ingredients in their finished products because soybeans have several negative factors. First, soy meal has a very beany flavor. Second, most soybean meal has reduced protein solubility, normally less than 50% because most of the current processes use heat to deactivate the trypsin inhibitors and remove residual hexane from the extraction process. Third, because the protein solubility is reduced and the trypsin-inhibitors have not been completely deactivated, the body absorbs less protein. Finally, soy meal causes flatulence and bloating and has a chalky texture stachyose and raffinose are present.

In conventional processing of soybeans, soy protein flour, soy protein concentrate, and soy protein isolates are all produced in different non-integrated sections of the plant. Further processing of the soy meal is carried out to produce soy protein isolates and soy protein concentrates separately after soy oil extraction when the extraction solvents have been removed. Soy protein concentrates are produced by either an acidic extraction or an aqueous/alcohol extraction of soluble carbohydrates, whereby at least 10% of the protein is lost. On the other hand, soy protein isolates are normally produced in two steps. First, the soluble carbohydrates and proteins are separated by alkaline extraction and centrifugation. Second, the proteins are precipitated by acid and/or aqueous/alcohol wash and removed by centrifugation. Normally, 30-35% of the proteins is lost because the alkaline extraction causes a loss of insoluble proteins and the acidic/aqueous-alcohol extraction causes a loss of soluble proteins. Under these conditions, the soy protein is denatured and loses its solubility, resulting in a low protein dispersibility index (PDI) (also referred to as the protein digestibility index or the nitrogen solubility index (NSI)), which is defined as the amount of digestible (soluble) protein relative to the overall amount of protein within a material.

Soy meal contains naturally occurring proteins known as trypsin inhibitors that block the action of the trypsin enzyme within the human digestive tract. During protein digestion, the pancreas produces the trypsin enzyme that cleaves the amino acid bonds within proteins to make those proteins more digestible. Unfortunately, the trypsin does not cleave the amino acid bonds within the trypsin inhibitor proteins in soy meal. Rather, the trypsin inhibitor proteins within the soy meal bond with the trypsin enzymes, thereby preventing the trypsin enzymes from cleaving the amino acid bond on the other digestible proteins. The trypsin inhibitor protein-trypsin enzyme interaction causes the pancreas to produce excessive amounts of trypsin enzymes and thereby causes the pancreas to increase beyond its normal size. Furthermore, the interaction also causes the body's ability to digest proteins to decrease dramatically.

Prior art methods have used heat to deactivate the trypsin inhibitor proteins by denaturing them. Denaturing of proteins occurs when proteins change their structural form. When heat is used, the trypsin inhibitor proteins are denatured so that the bonding sites between the trypsin inhibitor proteins and the trypsin enzymes become inaccessible to the trypsin enzymes. Although the heat eliminates the trypsin inhibition problems, it decreases the digestibility of the other proteins because it denatures the other proteins present in the soy meal. The trypsin enzymes cannot access the sites where the trypsin enzyme cleaves the amino acid bonds in the proteins. Thus, the use of heat results in denatured proteins, causing the NSI of the resulting product to decrease significantly. Therefore, a soy meal treatment process meeting the following objectives is desired.

OBJECTS AND ADVANTAGES OF THE INVENTION

As enzyme technology and enzyme availability has grown, enzymatic treatments have become feasible. The enzyme combinations and unit operations are combined in his invention to produce an integrated process for all protein products. In the integrated process of this invention, the use of heat and the resulting decrease in PDI is avoided. It is now possible to achieve up to and grater than 99% protein yield for soy protein concentrate, greater than 8-% yield for soy protein isolated, a PDI of greater than 50%, and products without the expected beany flavor found in most soy meals.

The soy meal products of this invention and the methods of producing these products have several favorable characteristics. First, there is the absence of the beany flavor and presence of hydrolyzed, shorter-chained proteins and carbohydrates, which have lower molecular weights and are easier to digest. The protein solubility levels are at or greater than 90% and the manufacturing yields are at or greater than 75%. By maximizing the deactivation of the trypsin inhibitors, there is increased protein absorption. Because stachyose and raffinose are almost completely eliminated, the problems associated therewith are eliminated. Finally, due to the presence of low molecular weight simple sugars-glucose, fructose, and galactose, the soy meal has a sweeter flavor.

With these considerations in mind, it is therefore an object of this invention to provide an improved method of producing soy protein flour and other soy products without denaturing the protein.

It is a further object of this invention to produce soy protein flour having a high protein dispersibility index and a low trypsin inhibitor content.

It is a further object of this invention to produce soy protein products with little or not stachyose and raffinose therein.

It is a further object of this invention to provide soy protein flour that has a sweet taste and a higher protein dispersibility index than soy protein products produced by prior art processes.

It is a further object of this invention to produce soy protein products with a high protein dispersibility index and without a beany flavor and smell.

These and other objects and advantages will become apparent from the ensuing detailed description of the invention.

SUMMARY OF THE INVENTION

The invention disclosed herein is a method for enzymatically stabilizing soy meal containing a naturally-occurring trypsin inhibitor to produce a soluble, pleasant-tasting soy produce comprising the steps of preparing a soy meal slurry to substantially deactivate said trypsin inhibitor, and waiting a sufficient period of time for said trypsin inhibitor deactivating enzyme to deactivate said trypsin inhibitor. The method further comprises the step of hydrolyzing the soy meal with carboyhydrase enzymes to convert long-chained carbohydrates into shorter-chained molecules. The method further comprises the step of separating low molecular weight carbohydrates from said soy meal slurry to produce a raffinate and a permeate, the permeate containing said low molecular weight carbohydrates. Pasteurization and drying are used to produce the final soy products.

DETAILED DESCRIPTION OF PREFERRED EMBODIMENTS OF THE INVENTION

Figure 1:
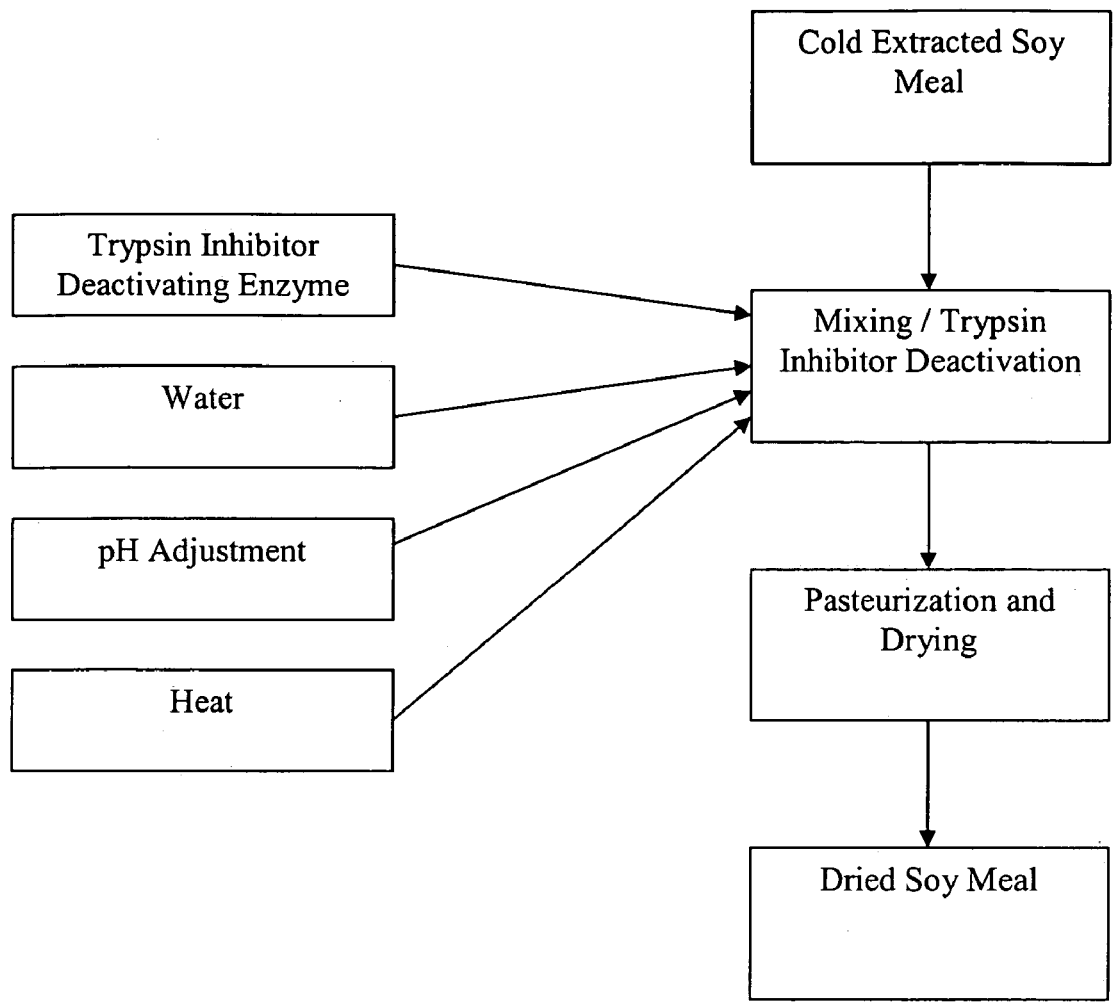
FIG. 1 is a flow diagram showing the trypsin inhibitor deactivation step along with a step to a final soy meal product.

Illustrative preferred processes of the invention are set forth below with specific references to the Figures. It is not the intent of the inventors that the scope of the invention be limited to these preferred embodiments.

As shown in the Figures, the process described herein can be used to make several high quality soy products, including soy protein flour, soy protein concentrates, and soy protein isolates. the soy material used as the starting product in the present invention may be either full-fatted soy material or defatted soy meal produced after the soybeans have been dehulled. when defatted soy meal is used, it is preferred that defatted soy meal be produced by a cold-extraction process because of the high quality of the soy meal product that results from cold extraction. a preferred cold extraction process which may be used with this invention is described in U.S. Pat. No. 5,707,673 to Prevost, et al. which is hereby incorporated by reference in its entirety to the extent it is not inconsistent with the teachings herein.

The soy meal is initially mixed with water into an aqueous soy meal slurry having between about 10% and about 30% soy meal by weight. The preferred weight is between about 15% and about 20% soy meal by weight. the soy meal slurry can then be milled using a wet Fryma milling operation to increase the particle surface area to weight ratio. Though not shown in the Figures, the slurry may be filtered to remove any residual color and/or soy flavor components. Filtration operations are preferably performed using an ultra-filtration membrane having a molecular weight cut-off of about 9,000. As used herein ultra-filtration is meant to include modified versions of ultra-filtration such as diafiltration.

After the soy meal slurry is mixed, the pH of the soy meal slurry is adjusted to between about 3.0 and about 10.0, preferably to about 8.5. Appropriate agents include sodium hydroxide, sodium bicarbonate or other suitable substances. The soy meal slurry is heated to between about 10° C. and about 65° C., preferably to about 55° C.-60° C.

After the temperature has been adjusted, the soy meal slurry is enzymatically treated to remove the naturally-occurring trypsin inhibitor protein complexes ("trypsin inhibitors") in the soy meal. This is achieved using an enzyme complex δ that can substantially deactivate the trypsin inhibitors and is preferably a protease enzyme of plant, fungal, bacterial or animal origin. Preferred enzyme complexes are ALCALASE 2.4L or PROTAMEX MG, both of which are available from Novo Nordisk BioChem North America in Franklinton, N.C. Enzyme complex δ, a trypsin inhibitor deactivating enzyme, deactivates the trypsin inhibitors, prevents them from interacting and bonding with the trypsin enzymes within the human digestive system, and prevents the problems described above.

ALCALASE 2.4L has an activity of 2.4 Anson Units per gram (AU/g) and is generally obtainable from a variety of plant, animal, bacterial or fungal sources. One such common source is the bacteria, *Bacillus lichenformis*. PROTAMEX MG is a *Bacillus* protease complex having an activity of 1.5 UA/g.

A primary component of ALCALASE is an endoprotease enzyme known as Substilisin A (Substilisin Barlsberg). This endoprotease enzyme cleaves the amino acid bonds within the trypsin inhibitors present in the soy meal, thereby deactivating the trypsin inhibitors present therein. PROTAMEX MG contains an ecto-endoprotease enzyme, which not only cleaves the amino acid bonds within the trypsin inhibitors, but also cleaves the amino acid bonds at the tail ends of the trypsin inhibitors. Because PROTAMEX MG contains the ecto-endoprotease, it is preferred over ALCALASE, although either enzyme complex will work.

Enzyme complex δ is preferably added in the amount between about 0.001 to about 5, more preferably about 0.6 parts enzyme per 100 parts soy meal by weight, but higher or lower ratios could also be used.

Figure 2:
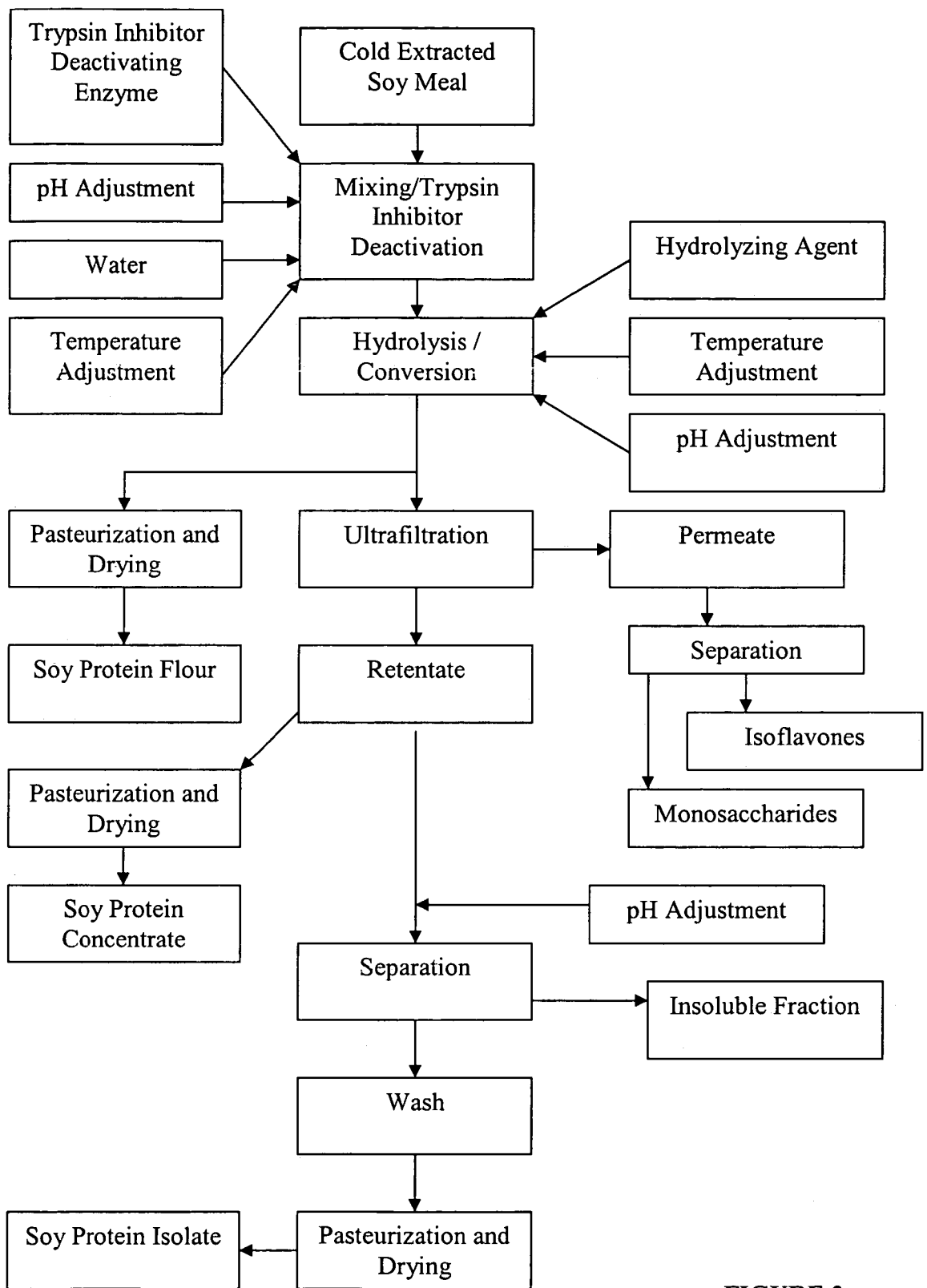
FIG. 2 is a flow diagram showing the entire process used to produce one or more soy products.

The trypsin inhibitor deactivation occurs for between about 1 and 5 hours, preferably about 3 hours, or until substantially all of the trypsin inhibitors have been deactivated, which can be determined by measuring the urease activity within the slurry. if the urease activity shows less than a 0.2 pH increase over a thirty minute interval, then the deactivation step is complete. As shown in FIG. 1, the treated soy meal slurry can then be pasteurized and dried as described below to produce a dried soy meal product. The trypsin inhibitor deactivating enzyme deactivates at least 85% of trypsin inhibitors, and the inactivation rate can reach about 99% or higher. As seen in FIG. 2, after substantially all of the trypsin inhibitors have been deactivated, the pH of the soy meal slurry is adjusted to between about 3.5 and about 9.0, preferably between about 4.0 and about 6.5, more preferably between abut 5.5 and about 5.7. Appropriate agents include hydrochloric acid, citric acid, lactic acid, organic acid or other suitable substance. The temperature is then adjusted to between about 50° C. and about 60° C., preferably between about 50° C. and about 55° C. The slurry is then hydrolyzed using a hydrolyzing agent, such as carbohydrase enzyme complex δ to convert substantially all of the long-chained oligosaccharides such as stachyose and raffinose are broken into lower molecular weight monosaccharides such as glucose, fructose and galactose. The conversion rate can reach about 99% or higher. The hydrolyzing agent may also include another enzyme, carbohydrase enzyme complex β, as discussed below.

Carbohydrase enzyme complex α is an alpha-galactosidase selected from a group consisting of fungal or bacterial alpha-galactosidases or mixtures thereof. Preferably, ALPHA-GAL 600L is used; it is available under the trade name ALPHA-GAL from Novo Nordisk BioChem North American in Franklinton, N.C. or from Valley Research, Inc. of South Bend, Ind. ALPHA-GAL 600L is an alpha-galactosidase enzyme preparation obtained by submerged fermentation of *Aspergillus niger*. It has an alpha-galactosidase activity of about 600 GALU/g where GALU is galactosidase units. Carbohydrase enzyme complex α is preferably added in the amount of about 0.001 to about 5, more preferably about 1 part enzyme complex α per 100 parts soy meal by weight, but higher or lower ratios could also be used. ALPHA-GAL 600L hydrolyzes the long-chain links in the oligasaccharides such as stachyose and raffinose, converting them to short-chained lower molecular weight monosaccharides.

Carbohydrase enzyme complex β added to the soy meal slurry is preferably VISCOZYME L, more preferably VISCOZYME 120L, available from Novo Nordisk BioChem North America in Franklinton, N.C. The activity of this enzyme is approximately 100 FBG/g where FBG is a fungal beta glucanase unit. The VISCOZYME L multi-enzyme complex contains a wide variety of carbohydrases, including arabanase, cellulase, beta-glucanase, hemicellulase, and xylanase. The enzyme is preferably prepared from a fungus of the *Aspergillus* group. Carbohydrase enzyme mixture β per 100 parts soy meal by weight, but higher or lower ratios could also be used. VISCOZYME 120L hydrolyzes the long-chain links in the complex carbohydrates within the soy meal to reduce the viscosity of the soy meal slurry, thereby allowing easier downstream processing, separation and filtration.

Hydrolysis, utilizing at least carbohydrase enzyme complex α and preferably utilizing carbohydrase enzyme complex β, is carried out for approximately about 1 to about 5 hours, preferably about 3 hours, so that substantially all of the oligasaccharides have been converted to monosaccharides. Other enzymes, including derivatives of the enzymes described herein, could also be used as long as they perform the functions of carbohydrase enzymes complexes α, β.

Although the process has been described as deactivating the trypsin inhibitors before hydrolyzing the carbohydrates, the steps could be reversed without any change in the characteristics in the resulting product.

The product of the above described process, hereinafter referred to as modified soy meal, can then be processed in one of two ways. First, soy protein flour can be produced from modified soy meal, sill in slurry form, by pasteurizing and drying the modified soy meal. In the pasteurization step, the pH of the slurry is re-adjusted to between about 6.5 and about 7.0 using sodium hydroxide or another suitable material. The modified soy meal slurry is then carried through an ultra-high temperature (UTH) treatment system at about 120° C. for three seconds and flashed into atmospheric pressure. Pasteurization is performed to deactivate the enzymes and ensure microbial quality. The modified soy meal slurry is then dried using a conventional spray-drying apparatus having an inlet temperature of between 200° C. and about 230° C., preferably about 220° C., and an outlet temperature of about 90° C., resulting in soy protein flour.

Instead of pasteurization and drying, the modified soy meal slurry can be further processed to yield additional products. The modified soy meal slurry is passed through an ultra-filtration system, having a molecular weight cut-off of about 4 to 20,000. As used herein, cut-off is defined as the molecular weight of the solute at which the membrane exhibits 90% rejection. Such a membrane can be obtained from Amicon Co., a division of Millipore Co. in Massachusetts. Ultra-filtration should be carried out in a tubular system or a spiral system because of the high viscosity of the modified soy meal. Ultra-filtration is carried out until the °Brix (% weight of carbohydrate in the solution) is lower than 0.5°B in the permeate. The permeate may then be concentrated by standard reverse osmosis and an evaporation process (not shown in the figures) to produce a soy syrup comprising low molecular weight monosaccharides such as glucose, fructose and galactose, and isoflavones.

The retentate from the ultra-filtration can be pasteurized and dried to form a usable product known as soy protein concentrate. Alternatively, the retentate can be treated to form soy protein isolate.

The retentate is treated so that the pH is increased to about 8.5 using sodium hydroxide or another suitable material. The protein in the retentate is then isolated and separated by centrifugation, or other suitable means, into a protein fraction and a water-insoluble fraction. The protein fraction is then washed to secure a good yield. Alternatively, the isolation and separation can be made using a micro-filtration system to obtain a 100% soluble isolate, but a good protein yield will be sacrificed. The protein fraction is pasteurized and dried to produce soy protein isolate. The micro-filtration membrane preferably has a molecular weight cut-off of about 4,000 to about 30,000 and is available from Amicon Co., a division of Millipore Co. in Massachusetts.

The permeate into a ultra-filtration step can alternatively be separated in a filtration system to separate the permeate into a monosaccharide component and an isoflavone component, using membrane having a molecular weight cut-off of about 4 to 20,000. The membrane is preferably a spiral or tubular membrane and is available from Amicon, Co., a division of Millipore Co. in Massachusetts. Alternatively, the ultra-filtration step can be conducted using a diafiltration process. The monosaccharide component contains primarily monosaccharides, while the isoflavone component contains primarily isoflavones.

Alternatively, isoflavones are separated from the slurry before the trypsin inhibitors have been deactivated. In such an embodiment of the process, the carbohydrates are first hydrolyzed using at least carbohydrase enzyme complex α and preferably including carbohydrase enzyme complex β as described herein. The isoflavones and short-chained, low molecular weight monosaccharides are then separated from the resulting mixture before the remaining soy meal slurry is passed to trypsin inhibitor deactivation and further processing as described above to produce soy protein isolate, soy protein concentrate and a water-insoluble fraction.

The products of these processes have many advantages over the products produced by the methods in the past. The soy protein flour produced by this invention has improved characteristics over the soy protein flour produced by prior art methods. First, it has a high protein dispersibility index and a low trypsin inhibitor content. Little or no stachyose and raffinose is found in the improved soy protein flour, ensuring a high nutritional quality. The improved soy protein flour has a sweet taste and a high digestible energy level than prior soy protein flours.

The soy protein concentrate has a high protein dispersibility index without the beany flavor and small, ensuring good quality for human consumption. The new process disclosed herein ensures this high quality while at the same time producing a high overall yield of products. Compared to the products and processes in the prior art, the products produced by the methods of this invention are higher in nutritional value and have higher protein dispersibility indexes.

EXAMPLE #1

The following example shows the effectiveness of the invention. A test was performed to evaluate the effectiveness of the process. Soy meal, defatted according to the method of U.S. Pat. No. 5,707,673 and using propane as the oil-extractant was mixed with water and proteolytic enzyme in the following amounts:

| Ingredient | Amount (grams) |
|---|---|
| Defatted Soy Meal | 100.00 |
| Water | 200.00 |
| ALCALASE 2.4 enzyme | 0.6 |
| Alpha-galactosidase enzyme | 1.0 |
| TOTAL | 301.6 |

The ingredients were mixed into a Hobart 5 quart container and mixed for 5 minutes. The mixture was incubated at 50° C. in an oven. Samples were taken every 30 minutes and tested for Urease activity. When the Urease activity reached a level of less than 0.2 pH increase between measurements, the incubation was stopped, and the samples were frozen and analyzed by Ralston Analytical Laboratories of St. Louis, Mo. As shown in the results, toasted soy meal is soy meal treated with heat to deactivate the trypsin inhibitors. A comparison of soy meals shows the results:

|  | Untreated Soy Meal | Toasted Soy Meal | Test Sample #1 | Test Sample #2 |
|---|---|---|---|---|
| Protein Dispersibility Index (%) | 90.0 | 20.0 | 79.9 | 79.9 |
| Urease Activity | >2.0 | <0.2 | <0.05 | <0.05 |
| Sugars (% by weight) |  |  |  |  |
| Fructose | 1.9 | 1.9 | 1.08 | 4.6 |
| Glucose | 1.2 | 1.2 | 0.85 | 7.2 |
| Sucrose | 8.2 | 8.2 | <0.2 | <0.2 |
| Maltose | 1.4 | 1.4 | <0.2 | <0.2 |
| Stachyose | 5.5 | 5.5 | <0.2 | <0.2 |
| Raffinose | 1.2 | 1.2 | <0.2 | <0.2 |

EXAMPLE #2

Soy meal, defatted according to the method of U.S. Pat. No. 5,707,673 and using propane as the oil-extractant was treated as follows. 5.5 kilograms of soy meal was mixed with 22 liters of water. The pH of the resulting slurry was adjusted to 8.0 using sodium hydroxide. The mixture was then wet-milled using a Fryma wet mill. The soy meal slurry was heated to about 50° C. to 55° C. and diafiltrated for about an hour over an ultra-filtration membrane having a molecular weight cut-off of about 9,000. Approximately 22 grams of PROTAMEX MG enzyme complex was then added to the slurry to deactivate the naturally-occurring trypsin inhibitors. The PROTAMEX MG treatment continued for about 3 hours, during which time the pH of the slurry dropped from 8.0 to about 7.0 and the °Brix increased from 15.6 to about 16.6.

The pH of the slurry was then decreased to about 5.0 with hydrochloric acid, and 22 grams of ALPHA-GAL 600 AND 11 grams of VISCOZYME L were added to the mixture. This treatment continued for another 3 hours. The pH of the mixture was then adjusted to 7.0 and the mixture was dried using a Niro lab spray drier having an inlet temperature of about 220° C. and an outlet temperature of about 90° C.

The resulting product was sent to Ralston Analytical Laboratories in St. Louis, Mo. for an analysis of the PDI/NSI of the resulting product. Analysis of the resulting product found one sample to have a protein dispersibility index of 88% and a second sample to have a protein dispersibility index of 92.9%.

Although the preferred embodiment has been described, it will be appreciated by those skilled in the art to which the present invention pertains that modifications, changes, and improvements may be made without departing from the spirit of the invention defined by the claims.

The invention claimed is:

1. A method for deactivating naturally occurring trypsin inhibitor in soy meal comprising:
    a) preparing a soy meal slurry from a full fatted soy meal; and
    b) adding a sufficient amount of trypsin inhibitor deactivating enzyme to said soy meal slurry to substantially deactivate said trypsin inhibitor; and,
    c) waiting a sufficient period of time for said trypsin inhibitor deactivation enzyme to deactivate said trypsin inhibitor wherein said soil meal slurry has not been heated above about 65° C.

2. The method according to claim 1 wherein said soy meal has not been heated above about 65° C. prior to preparation of said slurry.

3. The method according to claim 1 wherein said soy meal slurry is not heated over about 65° C. during deactivation of said trypsin inhibitors.

4. The method according to claim 1 wherein said soy meal slurry is adjusted to have a pH of at least about 7.0 before the addition of said trypsin inhibitor deactivation enzyme.

5. The method according to claim 1 wherein said soy meal in said slurry has a PDI of at least about 50% after said trypsin inhibitors have been substantially deactivated.

6. The method according to claim 1 wherein the said soy meal in said slurry has a PDI of at least about 60% after said trypsin inhibitors have been substantially deactivated.

7. The method according to claim 1 wherein said soy meal in said soy slurry has a PDI of at least about 90% after said trypsin inhibitors have been substantially deactivated.

8. The method according to claim 1 further comprising the steps of:
    a) adding a sufficient amount of a hydrolyzing agent to convert substantially all oligosaccharides present in said soy meal to monosaccharides; and
    b) waiting a sufficient amount of time for said hydrolyzing agent to convert substantially all oligosaccharides present in said soy meal to monosaccharides.

9. A method of enzymatically deactivating naturally occurring trypsin inhibitor in soy meal comprising the steps of:
   a) preparing a soy meal slurry from a soy meal defatted by a cold extraction process wherein said soil meal slurry has not been heated above about 65° C.; and
   b) adding a sufficient amount of trypsin inhibitor deactivating enzyme to said soy meal slurry to substantially deactivate said trypsin inhibitor; and
   c) waiting a sufficient period of time for said trypsin inhibitor deactivation enzyme to deactivate said trypsin inhibitor while maintaining said temperature.

10. The method according to claim 9 where in said soy meal has not been heated above about 65° C. prior to preparation of said slurry.

11. The method according to claim 9 wherein said soy meal slurry is adjusted to have a pH of at least about 7.0 before the addition of said trypsin inhibitor deactivation enzyme.

12. The method according to claim 9 wherein said soy meal in said soy meal slurry has a PDI of at least about 50% after said trypsin inhibitors have been substantially deactivated.

13. The method according to claim 9 wherein said soy meal in said soy meal slurry has a PDI of at least about 60% after said trypsin inhibitors have been substantially deactivated.

14. The method according to claim 9 wherein said soy meal in said soy meal slurry has a PDI of at least about 90% after said trypsin inhibitors have been substantially deactivated.

15. The method according to claim 9 further comprising the steps of:
   a) adding a sufficient amount of hydrolyzing agents to said soy meal slurry to convert substantially all oligosaccharides present in said soy meal to monosaccharides; and
   b) waiting a sufficient amount of time for said hydrolyzing agent to convert substantially all oligosaccharides present in said soy meal to monosaccharides.

16. A method for enzymatically deactivating naturally occurring trypsin inhibitor in soy meal comprising the steps of:
   a) preparing a soy meal slurry at a temperature between 10° and 65°; and
   b) adding a sufficient amount of trypsin inhibitor deactivation enzyme to said soy meal slurry to substantially deactivate said trypsin inhibitor; and
   c) waiting a sufficient period of time for said trypsin inhibitor deactivating enzyme to deactivate said trypsin inhibitor while maintaining said temperature wherein said soil meal slurry has not been heated above about 65° C.

17. The method according to claim 16 wherein said soy meal has not been heated above about 65° C. prior to preparation of said slurry.

18. The method according to claim 16 wherein said soy meal slurry is not heated above about 65° C. during deactivation of said trypsin inhibitors.

19. The method according to claim 16 wherein the temperature of said soy meal slurry is maintained between about 20° C. and about 60° C. during deactivation of said trypsin inhibitor.

20. The method according to claim 16 wherein said soy meal slurry is adjusted to have a pH between 3.0 and 10.0 before the addition of said trypsin inhibitor deactivation enzyme.

21. The method according to claim 16 wherein said soy meal slurry is adjusted to have a pH of about 8.5 before the addition of said trypsin inhibitor deactivating enzyme.

22. The method according to claim 16 wherein said trypsin inhibitor deactivating enzyme is a protease enzyme selected from the group of plant protease enzymes, fungal protease enzymes, bacterial protease enzymes, animal protease enzymes, and combinations thereof.

23. The method according to claim 16 wherein said trypsin inhibitor deactivating enzyme is derived from *Bacillus* bacteria.

24. The method according to claim 16 wherein said trypsin inhibitor deactivating enzyme is a *Bacillus* protease complex consisting of ectoproteases and endoproteases.

25. The method according to claim 16 wherein said trypsin inhibitor deactivating enzyme is a *Bacillus* protease complex having an activity of at least about 1.5 Anson Units per gram.

26. The method according to claim 16 wherein said protease enzyme has an activity of about 2.4 Anson Units per gram.

27. The method according to claim 16 wherein said trypsin inhibitor deactivating enzyme is added in an amount between about 0.001 and about 5 parts enzyme per 100 parts soy meal dry weight.

28. The method according to claim 16 wherein said trypsin inhibitor deactivating enzyme is added in an amount between about 0.6 parts enzyme per 100 parts soy meal by dry weight.

29. The method according to claim 16 wherein the waiting period for said trypsin inhibitor deactivating enzyme to deactivate said trypsin inhibitor is at least 1 hour.

30. The method according to claim 16 wherein the waiting period for said trypsin inhibitor deactivating enzyme to deactivate said trypsin inhibitor is no more 5 hours.

31. The method according to claim 16 wherein at least about 85% of said trypsin inhibitors are deactivated.

32. The method according to claim 16 wherein at least about 90% of said trypsin inhibitors are deactivated.

33. The method according to claim 16 wherein at least about 99% of said trypsin inhibitors are deactivated.

34. The method according to claim 16 wherein said method further comprises the step of pasteurizing said soy meal slurry after deactivating said trypsin inhibitor enzyme.

35. The method according to claim 16 wherein said method further comprises the step of drying said soy meal slurry after pasteurizing said soy meal slurry.

36. The method according to claim 16 wherein said soy meal in said soy meal slurry has a PDI of at least about 50% after said trypsin inhibitors have been substantially deactivated.

37. The method according to claim 16 wherein said soy meal in said soy meal slurry has a PDI of at least about 60% after said trypsin inhibitors have been substantially deactivated.

38. The method according to claim 16 wherein said soy meal in said soy meal slurry has a PDI of at least about 90% after said trypsin inhibitors have been substantially deactivated.

39. The method according to claim 16 further comprising the steps of:
   a) adding a sufficient amount of a hydrolyzing agent to said soy meal slurry to convert substantially all oligosaccharides present in said soy meal to monosaccharides; and b) waiting a sufficient amount of time for said hydrolyzing agent to convert substantially all oligosaccharides present in said soy meal to monosaccharides.

40. The method according to claim 39 wherein the temperature does not exceed 65° C.

41. The method according to claim 39 further comprising the step of maintaining the temperature of said soy meal slurry between about 20° C. and about 60° C. during hydrolysis of said soy meal slurry.

42. The method according to claim 39 further comprising the stop of maintaining the temperature of said soy meal slurry between about 50° C. and about 55° C. during hydrolysis of said soy meal slurry.

43. The method according to claim 39 wherein said hydrolyzing agent is added in an amount between about 0.001 to about 5 parts enzyme per 100 parts soy meal by dry weight.

44. The method according to claim 39 wherein said hydrolyzing agent is added in an amount of about 1 part enzyme per 100 parts soy meal by dry weight.

45. The method according to claim 39 wherein the waiting period for said hydrolyzing agent to convert substantially all oligosaccharides present in said soy meal to monosaccharides is between at least 1 hour.

46. The method according to claim 39 wherein the waiting period for said hydrolyzing agent to convert substantially all oligosaccharides present in said soy meal to monosaccharides is no more than 5 hours.

47. The method according to claim 39 wherein said hydrolyzing agent converts at least about 95% of the oligosaccharides present in said soy meal to monosaccharides.

48. The method according to claim 39 wherein said hydrolyzing agent converts at least about 99% of the oligosaccharides present in said soy meal to monosaccharides.

49. The method according to claim 39 wherein said hydrolyzing agent is contains at least one carbohydrase enzyme.

50. The method according to claim 39 wherein said hydrolyzing agent is selected from the group consisting of fungal or bacterial alpha-galactosidases or mixtures thereof.

51. The method according to claim 39 wherein said hydrolyzing agent has an alpha-galactosidases activity of about 600 GALU/g.

52. The method according to claim 39 wherein said hydrolyzing enzyme is obtained from fungi from the *Asperigillus niger* strain.

53. The method according to claim 39 wherein said hydrolyzing agent further comprises a beta-galactosidase enzyme.

54. The method according to claim 39 wherein the pH of said slurry is maintained at a pH of 3.5-9.0 during hydrolysis.

55. The method according to claim 39 further comprising the step of separating substantially all of said monosaccharides from said soy meal slurry thereby forming a substantially monosaccharide free slurry and a monosaccharide solution.

56. The method according to claim 39 further comprising the step of separating at least about 90% of said monosaccharides from said soy meal slurry to produce a substantially monosaccharide free slurry.

57. The method according to claim 56 further comprising the step of pasteurizing said monosaccharide free slurry.

58. The method according to claim 56 further comprising the step of dying said monosaccharide free slurry.

59. The method according to claim 56 wherein said monosaccharide solution contains isoflavones and monosaccharides and further comprising the step of separating said monosaccharides from said isoflavones.

60. The method according to claim 39 further comprising the step pasteurizing said soy meal slurry.

61. The method according to claim 39 further comprising the step of drying said soy meal slurry.

62. The method according to claim 39 wherein said soy meal in said soy meal slurry has a PDI of at least about 50% after said trypsin inhibitors have been substantially deactivated.

63. The method according to claim 39 wherein said soy meal in said soy meal slurry has a PDI of at least about 60% after said trypsin inhibitors have been substantially deactivated.

64. The method according to claim 39 where said soy meal in said soy meal slurry has a PDI of at least about 90% after said trypsin inhibitors have been substantially deactivated.

65. The method according to claim 39 wherein said soy in said slurry has the following analysis:
  1) Dispersibility Index above about 65%;
  2) Percent Stachyose by weight less then about 0.2%; and
  3) Percent Raffinose by eight less than about 0.2%.

66. The method according to claim 16 wherein the soy meal slurry is prepared with a full fatted soy meal.

67. The method according to claim 66 wherein said soy meal has not been heated above about 65° C. prior to preparation of said slurry.

68. The method according to claim 66 wherein said soy meal slurry is not heated above about 65° C. during deactivation of said trypsin inhibitors.

69. The method according to claim 66 wherein the temperature of said soy meal slurry is maintained between about 20° C. and about 60° C. during deactivation of said trypsin inhibitors.

70. The method according to claim 66 wherein said soy meal slurry is adjusted to have a pH of 3.0-10.0 before the addition of said trypsin inhibitor deactivation enzyme.

71. The method according to claim 66 wherein said soy meal slurry is adjusted to have a pH of 8.5 before the addition of said trypsin inhibitor deactivating enzyme.

72. The method according to claim 66 wherein said soy meal slurry is adjusted to have a pH of about 8.5 before the addition of said trypsin inhibitor deactivating enzyme.

73. The method according to claim 66 wherein said trypsin inhibitor deactivating enzyme is a protease enzyme selected from the group of plant protease enzymes, fungal protease enzymes, bacterial protease enzymes, animal protease enzymes, and combinations thereof.

74. The method according to claim 66 wherein said trypsin inhibitor deactivating enzyme is derived from *Bacillus* bacteria.

75. The method according to claim 66 wherein said trypsin inhibitor deactivating enzyme is a *Bacillus* protease complex consisting of ectoproteases and endoproteases.

76. The method according to claim 66 wherein said trypsin inhibitor deactivating enzyme is *Bacillus* protease complex having an activity of at least about 1.5 Anson Units per gram.

77. The method according to claim 66 wherein said protease enzyme has an activity of at about 2.4 Anson units per gram.

78. The method according to claim 66 wherein said trypsin inhibitor deactivating enzyme is added in an amount between about 0.01 and about 5 parts enzyme per 100 parts soy meal by dry weight.

79. The method according to claim 66 wherein said trypsin inhibitor deactivating enzyme is added in an amount of about 0.6 parts enzyme per 100 parts soy meal by dry weight.

80. The method according to claim 66 wherein the waiting period for said trypsin inhibitor deactivating enzyme to deactivate said trypsin inhibitor is at least about 1 hour.

81. The method according to claim 66 wherein the waiting period for said trypsin inhibitor deactivating enzyme is no more than 5 hours.

82. The method according to claim 66 wherein at least 85% of said trypsin inhibitors are deactivated.

83. The method according to claim 66 wherein at least about 90% of said trypsin inhibitors are deactivated.

84. The method according to claim 66 wherein at least about 99% of said trypsin inhibitors are deactivated.

85. The method according to claim 66 wherein said method further comprises the step of pasteurizing said soy meal slurry after deactivating said trypsin inhibitor enzyme.

86. The method according to claim 66 wherein said method further comprises the step of drying said soy meal slurry after pasteurizing said soy meal slurry.

87. The method according to claim 66 wherein said soy meal in said slurry has a PDI of at least about 50% after said trypsin inhibitors have been substantially deactivated.

88. The method according to claim 66 wherein said soy meal in said soy meal slurry has a PDI of at least about 60% after said trypsin inhibitors have been substantially deactivated.

89. The method according to claim 66 wherein said soy meal in said soy meal slurry has a PDI of at least about 90% after said trypsin inhibitors have been substantially deactivated.

90. The method according to claim 66 further comprising the steps of:
    a) adding a sufficient amount of a hydrolyzing agent to said soy meal slurry to convert substantially all oligosaccharides present in said soy meal to monosaccharides; and
    b) waiting a sufficient amount of time for said hydrolyzing agent to convert substantially all oligosaccharides present in said soy meal to monosaccharides.

91. The method according to claim 90 wherein the temperature does not exceed 65° C.

92. The method according to claim 90 further comprising the step of maintaining the temperature of said soy meal slurry between about 20° C. and about 60° C. during hydrolysis of said soy meal slurry.

93. The method according to claim 90 further comprising the step of maintaining the temperature of said soy meal slurry between about 50° C. and about 55° C. during hydrolysis of said soy meal slurry.

94. The method according to claim 90 wherein said hydrolyzing agent is added in an amount between about 0.001 to about 5 parts enzyme per 100 parts soy meal by dry weight.

95. The method according to claim 94 wherein said hydrolyzing agent is added in an amount of about 1 part enzyme per 100 parts soy meal by dry weight.

96. The method according to claim 90 wherein the waiting period for said hydrolyzing agent to convert substantially all oligosaccharides present in said soy meal to monosaccharides is at least 1 hour.

97. The method according to claim 90 wherein the waiting period for said hydrolyzing agent to convert substantially all oligosaccharides present in said soy meal to monosaccharides is no more than 5 hours.

98. The method according to claim 90 wherein said hydrolyzing agents converts at least about 95% of the oligosaccharides present in said soy meal to monosaccharides is no more than 5 hours.

99. The method according to claim 90 wherein said hydrolyzing agent converts at least 99% of the oligosaccharides present in said soy meal to monosaccharides.

100. The method according to claim 90 wherein said hydrolyzing agent contains at least one carbohydrase enzyme.

101. The method according to claim 90 wherein said hydrolyzing agent is selected from the group consisting of flingal or bacterial alpha-galactosidases or mixtures thereof.

102. The method according to claim 90 wherein said hydrolyzing agent has an alpha-galactosidase activity of about 600 GALU/g.

103. The method according to claim 90 wherein said hydrolyzing enzyme is obtained from fungi from the *Aspergillus niger* strain.

104. The method according to claim 90 wherein said hydrolyzing agent further comprises a beta-galactosidase enzyme.

105. The method according to claim 90 wherein pH of said slurry is maintained at a pH of about 3.5-9.0 during hydrolysis.

106. The method according to claim 90 wherein the pH of said slurry is maintained at a pH of about 8.5 during hydrolysis.

107. The method according to claim 90 further comprising the step of separating substantially all of said monosaccharides from said soy meal slurry thereby forming a substantially monosaccharide free slurry and a monosaccharide solution.

108. The method according to claim 90 further comprising the step of separating at least about 90% of said monosaccharides from said soy meal slurry to produce a substantially monosaccharide free slurry and a monosaccharide solution.

109. The method according to claim 107 further comprising the step of pasteurizing said monosaccharide free slurry.

110. The method according to claim 107 further comprising the step of drying said monosaccharide free slurry.

111. The method according to claim 107 wherein said monosaccharide solution contains isoflavones and monosaccharides and further comprising the step of separating said monosaccharides from said isoflavones.

112. The method according to claim 90 further comprising the step of pasteurizing said soy meal slurry.

113. The method according to claim 90 further comprising the step of drying said soy meal slurry.

114. The method according to claim 90 wherein said soy meal is said soy meal slurry has a PDI of at least about 50% after said trypsin inhibitors have been substantially deactivated.

115. The method according to claim 90 wherein said soy meal in said soy meal slurry has a PDI of at least about 60% after said trypsin inhibitors have been substantially deactivated.

116. The method according to claim 90 wherein said soy meal in said soy meal slurry has a PDI of at least about 90% after said trypsin inhibitors have been substantially deactivated.

117. The method according to claim 90 wherein said soy in said slurry has the following analysis:
    a) Protein Dispersibility Index above about 65%;
    b) Percent Stachyose by weight less than about 0.2%; and percent Raffinose by weight less than about 0.2%.

118. A method for enzymatically deactivating naturally occurring trypsin inhibitor in soy meal comprising the steps of:

a) preparing a soy meal slurry at a temperature between 10° C. and 65° C.; and, b) adding a sufficient amount of trypsin inhibitor deactivation enzyme to said soy meal slurry to deactivate said trypsin inhibitor; and c) waiting a sufficient period of time for said trypsin inhibitor deactivating enzyme to deactivate said trypsin inhibitor while maintaining said temperature wherein said soy meal in said slurry has a Protein Dispersibility Index of at least about 60% upon completion of said deactivation of said trypsin inhibitors wherein said soil meal slurry has not been heated above about 65° C.

119. The method according to claim 118 wherein said soy meal has not been heated above about 65° C. prior to preparation of said slurry.

120. The method according to claim 118 wherein said soy meal slurry is not heated above about 65° C. during deactivation of said trypsin inhibitors.

121. The method of according to claim 118 said soy meal slurry is adjusted to have a pH between 3.0 and 10.0 before the addition of said trypsin inhibitor deactivation enzyme.

122. The method according to claim 118 wherein said soy meal slurry is adjusted to have a pH of 8.5 before the addition of said trypsin inhibitor deactivating enzyme.

123. The method according to claim 118 wherein said soy meal in said soy meal slurry has a PDI of at least about 70% after said trypsin inhibitors have been substantially deactivated.

124. The method according to claim 118 wherein said soy meal in said soy meal slurry has a PDI of at least about 80% after said trypsin inhibitors have been substantially deactivated.

125. The method according to claim 118 wherein said soy meal in said soy meal slurry has a PDI of at least about 90% after said trypsin inhibitors have been substantially deactivated.

126. The method according to claim 118 further comprising the steps of a) adding a sufficient amount of a hydrolyzing agent to said soy meal slurry to convert substantially all oligosaccharides present in said soy meal to monosaccharides; and b) waiting a sufficient time for said hydrolyzing agent to convert substantially all oligosaccharides present in said soy meal to monosaccharides.

* * * * *

UNITED STATES PATENT AND TRADEMARK OFFICE
CERTIFICATE OF CORRECTION

PATENT NO. : 7,300,680 B2
APPLICATION NO. : 10/458480
DATED : November 27, 2007
INVENTOR(S) : John E. Prevost and Neal A. Hammond It is certified that error appears in the above-identified patent and that said Letters Patent is hereby corrected as shown below:

Column 1, line 45, cancel the text "stachyose and raffinose are present" from the sentence and insert instead the following text --due to the presence of stachyose and raffinose--.

Column 2, line 43, "his" should be changed to --this--; line 46, "grater" should be changed to --greater--.

Column 3, line 5, "not" should be changed to --no--; line 54, "the" should be changed to --The--; line 57, "when" should be changed to --When--; line 60, "a" should be changed to --A--.

Column 4, line 1, "the" should be changed to --The--; line 55, "if" should be changed to --If--.

Column 5, line 1 "substance" should be changed to --substances--; lines 39-40, cancel the text "carbohydrase enzyme mixture β per 100 parts soy meal by weight" from the sentence and insert instead the following text --The carbohydrase enzyme complex β is preferably added in the amount of about 1 part enzyme complex β per 100 parts soy meal by weight--; line 7, cancel the text "are broken" from the sentence; line 61, "sill" should be changed to --still--.

Column 6, line 41, "into a" should be changed to --from the--.

Column 7, line 7, "small" should be changed to --smell--.

Column 8, line 12, "AND" should be changed to --and--.

Column 8, Claim 1, line 40, "soil" should be changed to --soy--.

Column 9, Claim 9, line 5, "soil" should be changed to --soy--.

Column 9, Claim 10, line 13, "where" and "in" should be changed to --wherein--.

Column 9, Claim 15, line 34, "agents" should be changed to --agent--.

Column 9, Claim 16, line 52, "soil" should be changed to --soy--.

Column 10, Claim 30, line 36, cancel the text "5 hours" from the sentence and insert instead the following text --than 5 hours--.

UNITED STATES PATENT AND TRADEMARK OFFICE
CERTIFICATE OF CORRECTION

PATENT NO. : 7,300,680 B2
APPLICATION NO. : 10/458480
DATED : November 27, 2007
INVENTOR(S) : John E. Prevost and Neal A. Hammond It is certified that error appears in the above-identified patent and that said Letters Patent is hereby corrected as shown below:

Column 11, Claim 42, line 11, "stop" should be changed to --step--.

Column 11, Claim 45, line 24, cancel the text "between" from the sentence.

Column 11, Claim 58, line 65, "dying" should be changed to --drying--.

Column 12, Claim 60, line 4, cancel the text "pasteurizing" and insert instead the text --of pasteurizing--.

Column 12, Claim 65, line 23, "eight" should be changed to --weight--.

Column 14, Claim 98, line 2, "agents" should be changed to --agent--.

Column 14, Claim 105, line 23, cancel the text "pH" and insert instead the text --the pH--.

Column 14, Claim 114, line 52, "is" should be changed to --in--.

Column 15, Claim 118, line 15, "soil" should be changed to --soy--.

Column 15, Claim 121, line 24, cancel the text "said soy meal" and insert instead the text --wherein said soy meal--.

Signed and Sealed this

Twenty-second Day of July, 2008

JON W. DUDAS
*Director of the United States Patent and Trademark Office*